2,945,017
Patented July 12, 1960

2,945,017
POLYETHYLENE PROCESS

Gaetano F. D'Alelio, South Bend, Ind., assignor, by mesne assignments, to W. R. Grace & Co., New York, N.Y., a corporation of Connecticut No Drawing. Filed Oct. 30, 1957, Ser. No. 693,231

13 Claims. (Cl. 260—94.9)

This invention relates to a novel synthesis of ethylene polymers.

More particularly, the invention involves making polyethylenes varying from oils to solids by subjecting ethylene in an inert solvent to the action of a catalyst prepared by subjecting titanium metal as wire, turnings, powder, or the like to the action of $SbCl_5$, whether or not in the presence of ethylene.

In general, the titanium-containing catalyst of this invention is prepared by treatment of Ti metal with $SbCl_5$ at substantially any temperature above room temperature, but preferably between about 130° C. and the melting point of titanium.

It has been found that the nature of the catalyst largely determines the nature of the polyethylene polymer, i.e., whether the product contains any substantial amount of solid polymer. As a general rule, if any material amount of antimony chlorides (e.g., $SbCl_5$, $SbCl_3$, etc.) is present in the reaction mixture along with the $SbCl_5$-treated titanium metal, the polymers resulting are oils of varying degrees of viscosity, and little or no solid polyethylene separates from the oil. Accordingly the nature of the polymer product will be determined largely by the presence or absence of antimony chlorides in, or adherent to, the metal catalyst, or in the reaction mixture.

Example 1

An electrically-heated vertical furnace made of a quartz tube 10 inches long and ¾ inch I.D., wrapped with electrical resistance wire was filled with fine Ti sponge (about 20 g.) and gradually heated to 315° C. It was maintained at this temperature for 18 hours while passing a vapor mixture of $SbCl_5$ in $N_2$ through the Ti powder. The metal was allowed to cool gradually to room temperature in a stream of nitrogen, thereby removing any unreacted $SbCl_5$. The Ti metal after this treatment was purple in color. In this run, apparently some $SbCl_3$ was formed by thermal decomposition of $SbCl_5$ as well as by reaction of $SbCl_5$ with Ti.

In this example, the $SbCl_5N_2$ vapor mixture was provided by bubbling dry $N_2$ through a flask of hot liquid $SbCl_5$. The resultant mixture contained about 0.15 vol. percent of $SbCl_5$, and was passed into the furnace at the rate of about 10.8 cc. per minute.

In forming the catalyst, it is considered essential to discontinue the reaction of $SbCl_5$ with Ti before the Ti is completely consumed, so that the material formed will consist essentially of Ti together with the reaction product of Ti with $SbCl_5$. The nature of this reaction product has not been definitely established, and in fact it appears to vary in composition depending on the conditions of reaction. Thus, the composition of such reaction product formed when Ti is boiled in $SbCl_5$ for 12–25 hours appears to be different from the composition of the product formed when Ti is heated at 200–500° C. with $SbCl_5$. In each case, however, it appears that some amount of a lower chloride of Ti is formed, i.e., $TiCl_2$ and/or $TiCl_3$, often with some $SbCl_3$, so that my experimental data are consistent with the theory that the catalyst comprises at least Ti plus $TiCl_2$ and/or $TiCl_3$. However, I do not wish to be bound by any theory of operation; it suffices to say that when Ti is heated with $SbCl_5$ in the manner herein described, a highly active catalyst is formed that is capable of polymerizing ethylene.

If it is desired to prepare the catalyst for use in making solid polyethylene with little or no liquid polyethylene, hydrocarbon-soluble chlorides should be removed from the activated titanium metal mass. A suitable procedure for removing hydrocarbon-soluble chlorides from the catalyst mass comprises one or more initial washes with a hydrocarbon known to form complexes with $SbCl_5$ and $SbCl_3$, e.g., benzene or toluene, followed by one or more washes with a non-complexing hydrocarbon, e.g., heptane, to remove any residual $SbC_5$-benzene or $SbCl_5$-toluene complex. However this particular means of chloride removal is by no means critical, since several washes with non-complexing hydrocarbons will accomplish the same result. Also, the hydrocarbon-soluble chlorides may be removed by other means obvious to one skilled in the art, e.g., by heating the Ti-containing mass and subliming such chlorides from the catalyst in a stream of inert gas, such as nitrogen, argon, or the like (as was done in Example 1).

Example 2

Twenty grams of Ti catalyst prepared by the procedure of Example 1 was placed in a 200 ml.-capacity stainless steel rocking autoclave containing 50 ml. heptane. Ethylene was forced into the autoclave at a pressure in the range of 500–1000 p.s.i.g., after which the autoclave was sealed, heated to the reaction temperature of 125° C., and maintained at this temperature for 36 hours under the autogenous pressure. At the end of the reaction the autoclave was cooled, vented, and the reaction mixture transferred to a beaker containing 200 ml. of methanol (acidified with a little HCl to dissolve metallic impurities) and boiled for 2 hours. A purified solid polyethylene of high molecular weight was recovered.

Example 3

Ten g. comminuted Ti sponge and 10 ml. $SbCl_5$ were placed in a 200 ml. stainless steel autoclave containing 100 ml. toluene which was then sealed and heated for 2 hours at 200° C., under the autogenous pressure. So that the catalyst would be suitable for the preparation of liquid polyethylene, the unreacted $SbCl_5$ was not removed.

Example 4

The autoclave containing the catalyst as prepared in the preceding example was allowed to cool (from 200° C.) to 175° C., after which ethylene was pumped in under 200 p.s.i.g., and then the autoclave was sealed and heated under the autogenous pressure for 24 hours. A polyethylene oil was obtained.

In the ethylene polymerization step, the reaction temperature is suitably 20 to 200–250° C., and the reaction pressure can range from fairly low pressures to fairly high pressures, i.e., from atmospheric pressure, e.g., 15 p.s.i., up to 10,000 p.s.i., and even higher. Obviously when it is desired to use a temperature higher than that of the boiling point of the inert solvent selected, the reaction must be carried out under superatmospheric pressure. Ordinarily, pressures of the order of atmospheric to 500–1000 p.s.i. will give a good yield of product.

As a polymerization menstruum, substantially any inert material can be used which is liquid under the conditions of temperature and pressure employed and which has a solvent action on ethylene. These solvents are well-known to those skilled in the art. Hydrocarbon solvents are preferred, and are preferably substantially free of materials which react with lower chlorides of titanium, e.g., water, $CO_2$, $O_2$, and the like. Suitable solvents include pentane, hexane, heptane, cyclohexane, octane, benzene, xylene, toluene, and the like. The aromatic hydrocarbons are the preferred solvents.

The amount of catalyst is not critical. Relatively small amounts are operable to form relatively large amounts of polyethylene. In general, a practical range is a weight ratio of 0.001–0.1 gram activated titanium per gram of ethylene polymerized. Even larger amounts of catalyst are operable, but present a purification problem as well as an economic problem.

*Example 5*

One gram of pure Ti wire is refluxed in a dry inert (i.e., $N_2$) atmosphere in 100 ml. of toluene containing 10 ml. of $SbCl_5$, in a 250 ml. three-neck flask equipped with stirrer, reflux condenser and $N_2$ inlet. After 12 hours' refluxing, the Ti wire becomes discolored. A slow stream of ethylene is then passed into the flask (maintained under reflux) at substantially atmospheric pressure for 6 hours. The mixture is filtered and washed with methanol. Upon evaporation of residual toluene and methanol a yield of heavy polymeric oil is obtained.

*Example 6*

Four grams Ti sponge are refluxed with 5 ml. $SbCl_5$ in a 100 ml. three-neck flask equipped with stirrer, reflux condenser and $N_2$ inlet. After 24 hours the metal appears purple and the reflux reaction is terminated. On cooling 50 ml. toluene is added to the flask and the contents of the flask are transferred to a $N_2$-purged 200 cc. stainless steel bomb. The bomb is pressurized with ethylene to 500–1000 p.s.i. and heated to a temperature of about 130° C. for 18 hours. During this period repeated repressurizing with ethylene is necessary to maintain the aforementioned pressure range. Upon cooling and depressurizing a substantial yield of a heavy polymer oil is isolated by the technique of Example 5.

*Example 7*

20.8 grams Ti sponge is placed in a reactor tube purged with $N_2$. After the tube is heated to about 400° C. a $SbCl_5$-enriched $N_2$ stream is passed into the tube and through the Ti metal for 5 hours. Upon cooling, the catalyst is washed 5 times with 10 ml. portions of toluene to remove excess chlorides. The catalyst is then transferred along with 50 ml. fresh toluene to a 200 cc. stainless steel bomb and heated to a temperature of about 150° C. The bomb is pressurized with ethylene to a pressure range which is allowed to vary between 200–400 p.s.i. Frequent repressurizing with ethylene is necessary during the 12-hour polymerization period. Upon cooling and depressurizing a very good yield of high molecular weight solid polymer is obtained.

The following examples set forth alternate procedures for heating Ti with $SbCl_5$ to provide the activated Ti catalyst of this invention.

*Example 8*

Ti sponge was crushed to provide finely divided material of a particle size such that most of it passed through a 20-mesh screen but was retained on a 30-mesh screen; it contained, however, 1–2% of minus 100-mesh material. One part by weight of this material was placed in a vessel equipped with reflux condenser and containing about 10 parts by weight of $SbCl_5$. The mixture was boiled under reflux for two hours while passing nitrogen through the vessel so as to prevent pick-up of moisture from the atmosphere. The resultant mixture contains activated Ti metal catalyst, which can be recovered and used as such, or, if desired, the entire mixture can be used, including unreacted $SbCl_5$, with results as herein described.

*Example 9*

A catalyst was prepared by passing $SbCl_5$ vapor for 6 hours through a glass tube packed with finely divided Ti maintained at a temperature of 125–140° C. The resultant material was allowed to cool under a stream of nitrogen, and was stored under slight nitrogen pressure.

*Example 10*

A length of Ti wire (99.9+ Ti, 140 Brinell hardness), $\frac{1}{20}$ inch in diameter, was suspended as a spiral of several coils in a 500 ml. three-neck flask equipped with reflux condenser, nitrogen inlet, and sealed outlet for the two ends of the wire. The flask contained 125 ml. $SbCl_5$. The wire was positioned throughout its length so that none of the coils touched each other, so as to avoid electrical short circuits. The coils were completely submerged in the $SbCl_5$ liquid. The two ends were connected to a source of E.M.F. providing 25 volts delivered at 4 amperes, through a variac so that the wire was heated by resistance. As the wire warmed up, the $SbCl_5$ began to boil vigorously at the surface of the wire. The variac was adjusted to keep the return of $SbCl_5$ in the reflux condenser at a low but steady rate, and these conditions were maintained overnight (12–15 hours) under a nitrogen atmosphere. Thereafter the $SbCl_5$ remaining was decanted, the flask and the treated wire still in position were washed with toluene, dried with warm nitrogen, and stored under a slight nitrogen pressure for use as a polyethylene catalyst by the process of this invention.

*Example 11*

Substantially the same materials and procedure were used as in Example 10, except that (*a*) only 15 ml. of $SbCl_5$ was used, (*b*) the wire was positioned so that none of it was immersed in the $SbCl_5$, nor exposed to liquid return from the reflux condenser, (*c*) the flask was heated externally to maintain the $SbCl_5$ boiling at a low rate, (*d*) the Ti wire was heated to dull redness in the resultant $SbCl_5$ vapor for about 10 minutes, and (*e*) the $SbCl_5$ was thereafter removed by boiling it out of the flask along with a stream of nitrogen. There was considerable thermal decomposition of $SbCl_5$ in this run.

The uses of the polyethylenes of this invention are analogous to the uses of those prepared by prior art procedures. The solid polyethylenes of this invention can be used to make moldings, film, filament, pipe, tubing, extruded articles, and the like, using the same equipment and techniques customary for solid polyethylenes of the prior art. The liquid polymers prepared by the process of this invention are useful as chemical intermediates for alkylation, epoxidation, and the like, by procedures well known to those skilled in the art, and as plasticizers for the solid polymers produced by the procedures herein described, e.g., 1 part of the oil produced in Example 4 can be thoroughly mixed with 10 parts of the solid polymer produced in Example 2 to give a product that is readily extruded into sheet in conventional sheet-extrusion apparatus.

I claim:

1. The method of polymerizing ethylene that includes the step of subjecting ethylene in an inert solvent to the action of a catalyst comprising titanium and a reaction product of titanium and $SbCl_5$ prepared by heating together titanium and $SbCl_5$ as the sole catalyst forming reactants to a temperature of 130–1800° C. for a time insufficient to consume all the titanium metal.

2. The method according to claim 1 in which the polymerization is carried out under a pressure of at least one atmosphere.

3. The method according to claim 2 in which the pressure is 15 to 1000 p.s.i.

4. The method according to claim 1 in which the polymerization temperature is at least 20° C.

5. The method according to claim 4 in which the temperature is 20 to 200° C.

6. The method according to claim 1 in which the polymerization is conducted in the presence of SbCl$_5$ whereby the resulting polymer comprises liquid polyethylene.

7. The method according to claim 1 in which the hydrocarbon-soluble chlorides are removed from the catalyst prior to use whereby the ethylene polymer comprises solid polyethylene.

8. The method according to claim 1 in which the catalyst preparation temperature is 130°–400° C.

9. The method according to claim 1 in which the weight ratio of catalyst to ethylene polymerized is about 1:10–1000.

10. The method that includes the step of heating Ti with SbCl$_5$ as the sole catalyst forming reactants to a temperature of 130–1800° C. for a time insufficient to consume the Ti metal and recovering a product consisting essentially of Ti metal and a reaction product of Ti and SbCl$_5$.

11. The method according to claim 10 wherein the heating step is carried out by boiling Ti with SbCl$_5$ for about 12–24 hours.

13. The method according to claim 10 in which the heating step is carried out by subjecting Ti to SbCl$_5$ vapor at 200–500° C.

13. The method according to claim 10 in which, after the heating step, excess SbCl$_5$ is removed from the reaction product.

References Cited in the file of this patent

UNITED STATES PATENTS

| | | |
|---|---|---|
| 2,406,869 | Upham | Sept. 3, 1946 |

FOREIGN PATENTS

| | | |
|---|---|---|
| 1,132,506 | France | Nov. 5, 1956 |
| 547,618 | Belgium | Nov. 7, 1956 |